Jan. 3, 1939.   R. L. ROUGEMONT   2,142,735
METHOD AND MACHINE FOR METALWORKING
Filed Dec. 4, 1936   6 Sheets-Sheet 6
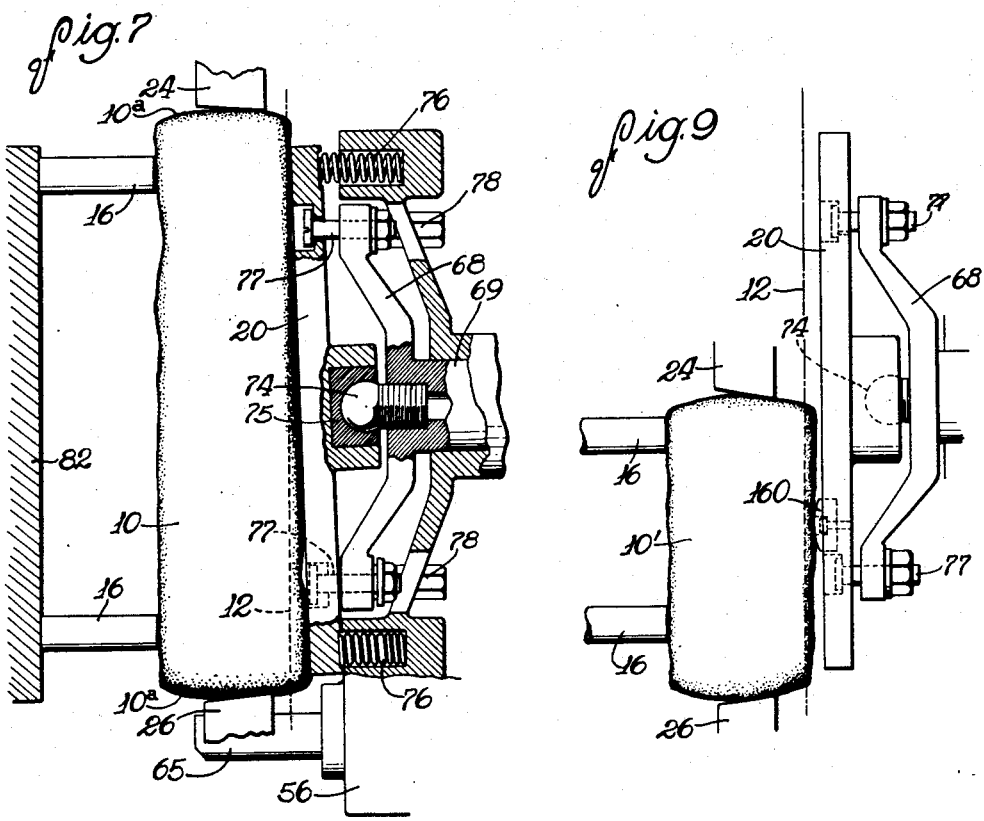
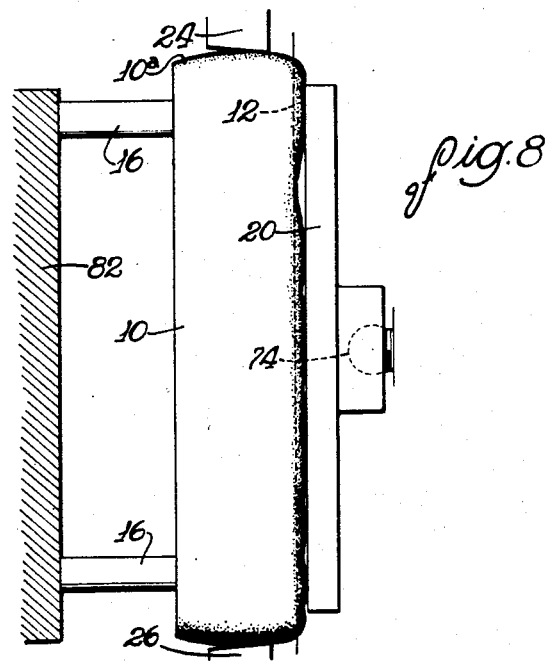
INVENTOR
Rene Louis Rougemont
ATTORNEYS Patented Jan. 3, 1939

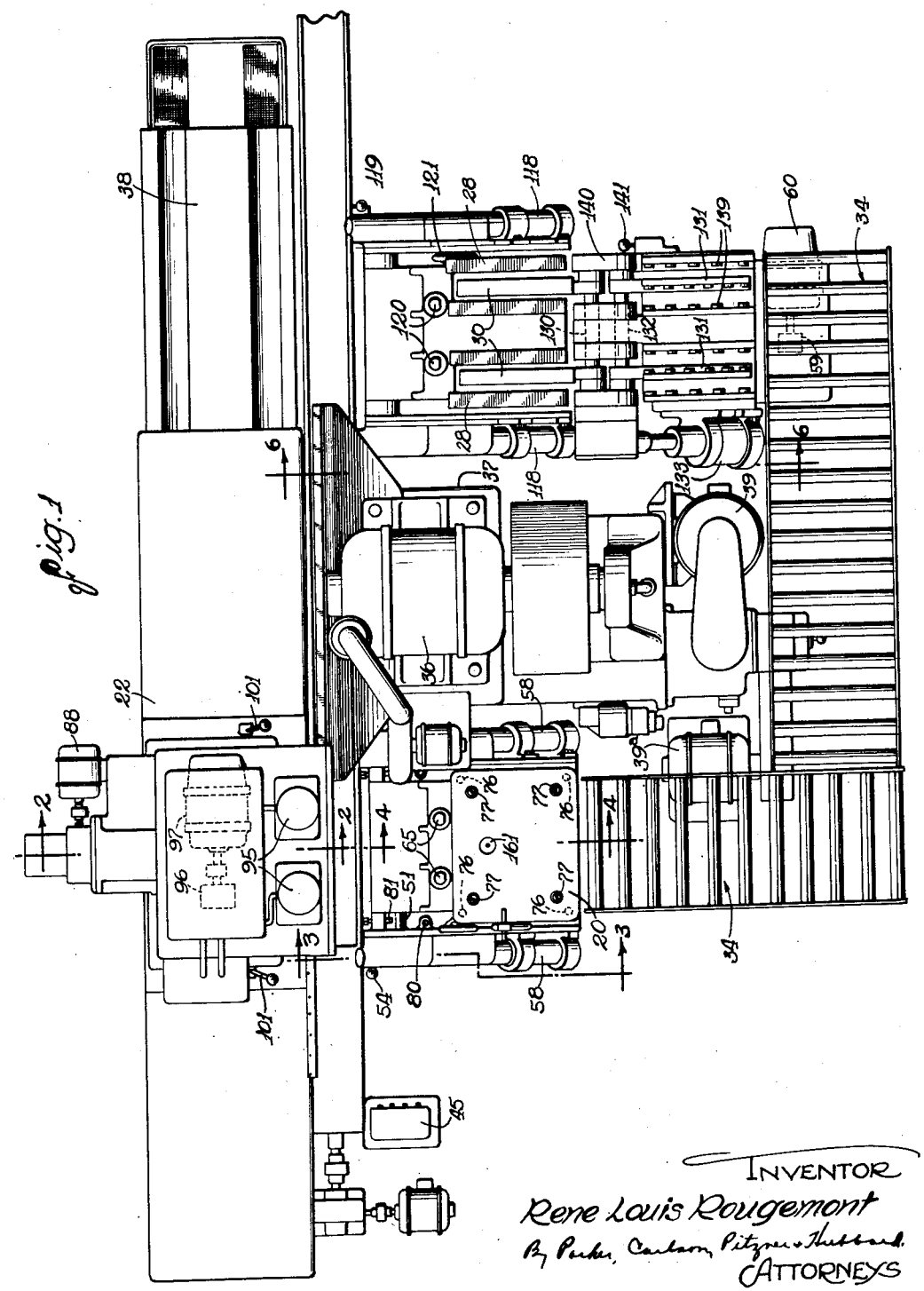

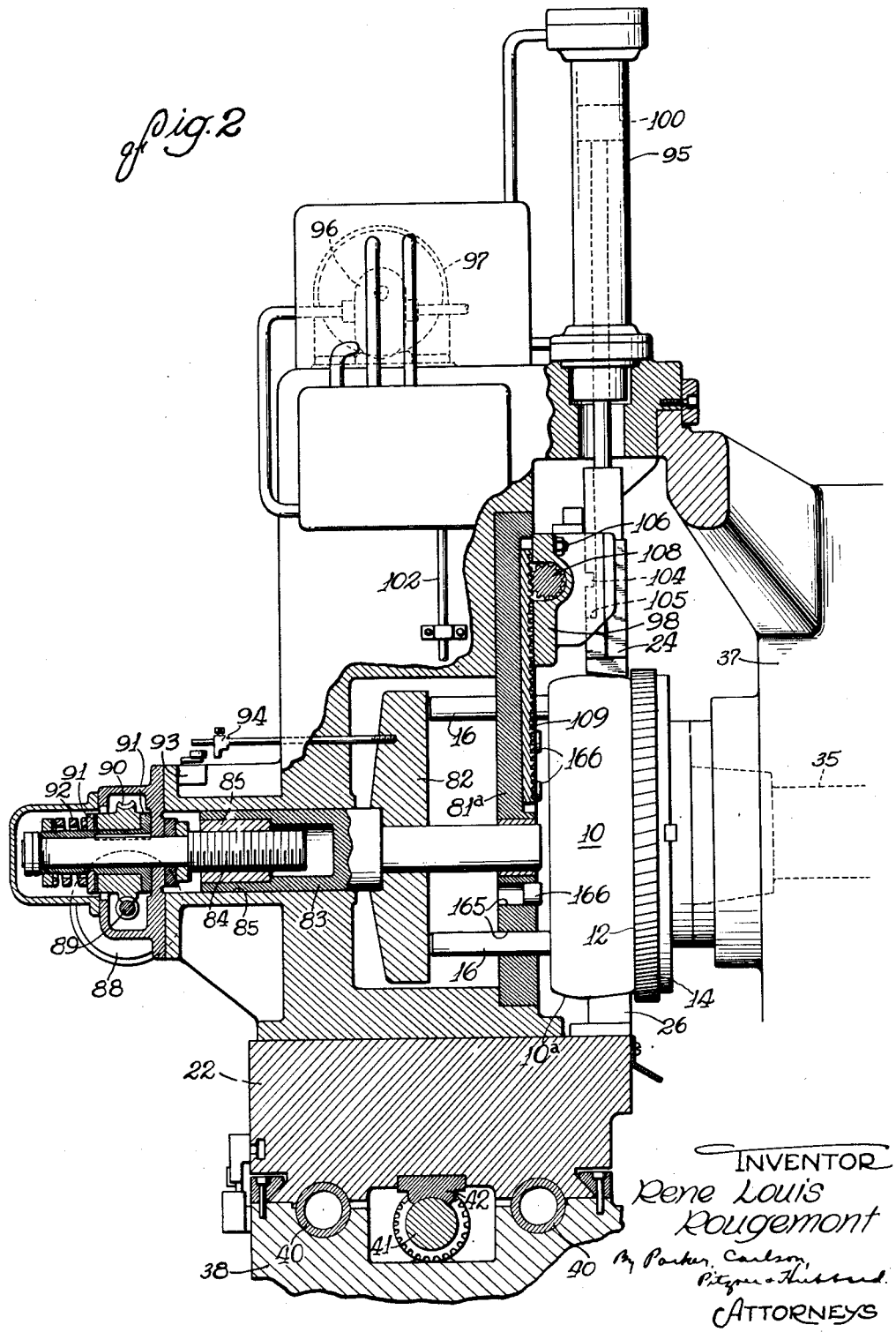

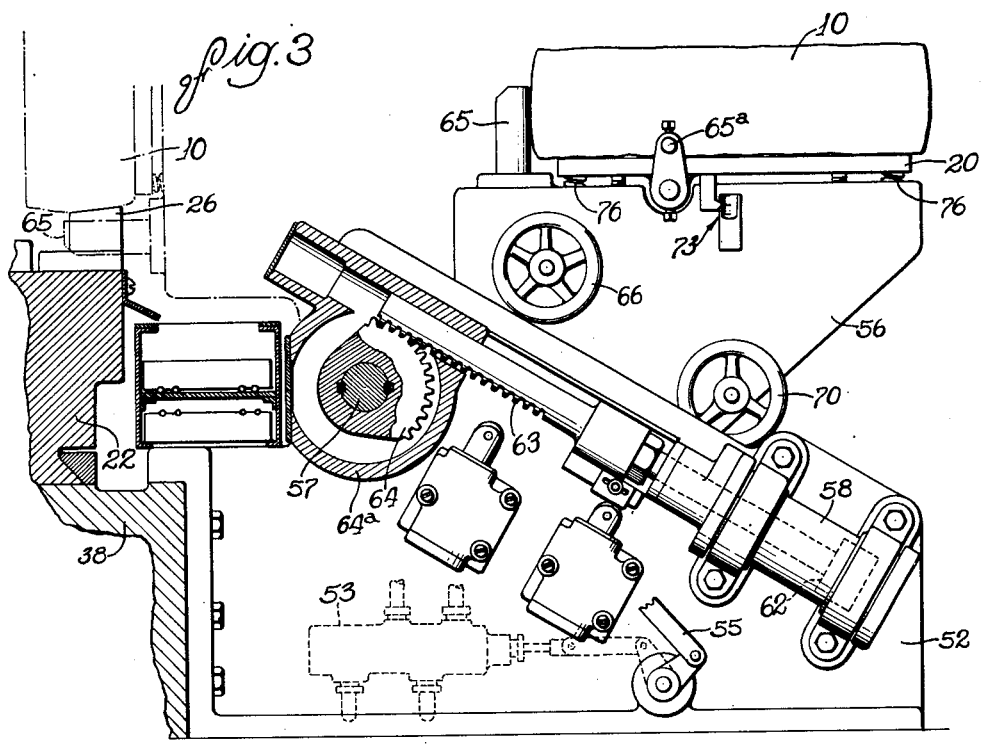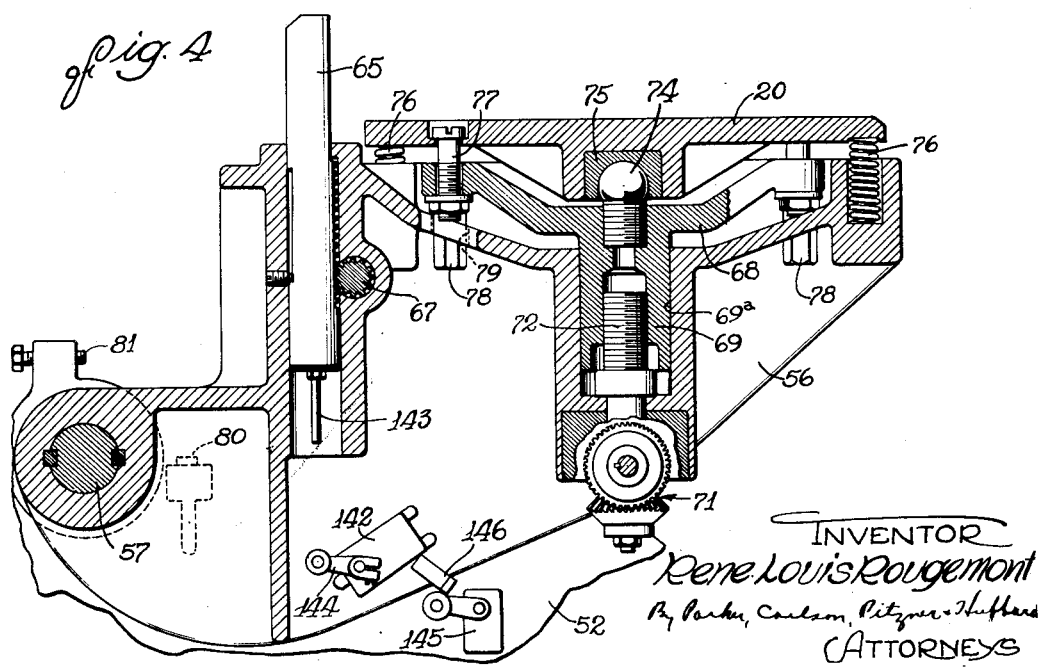

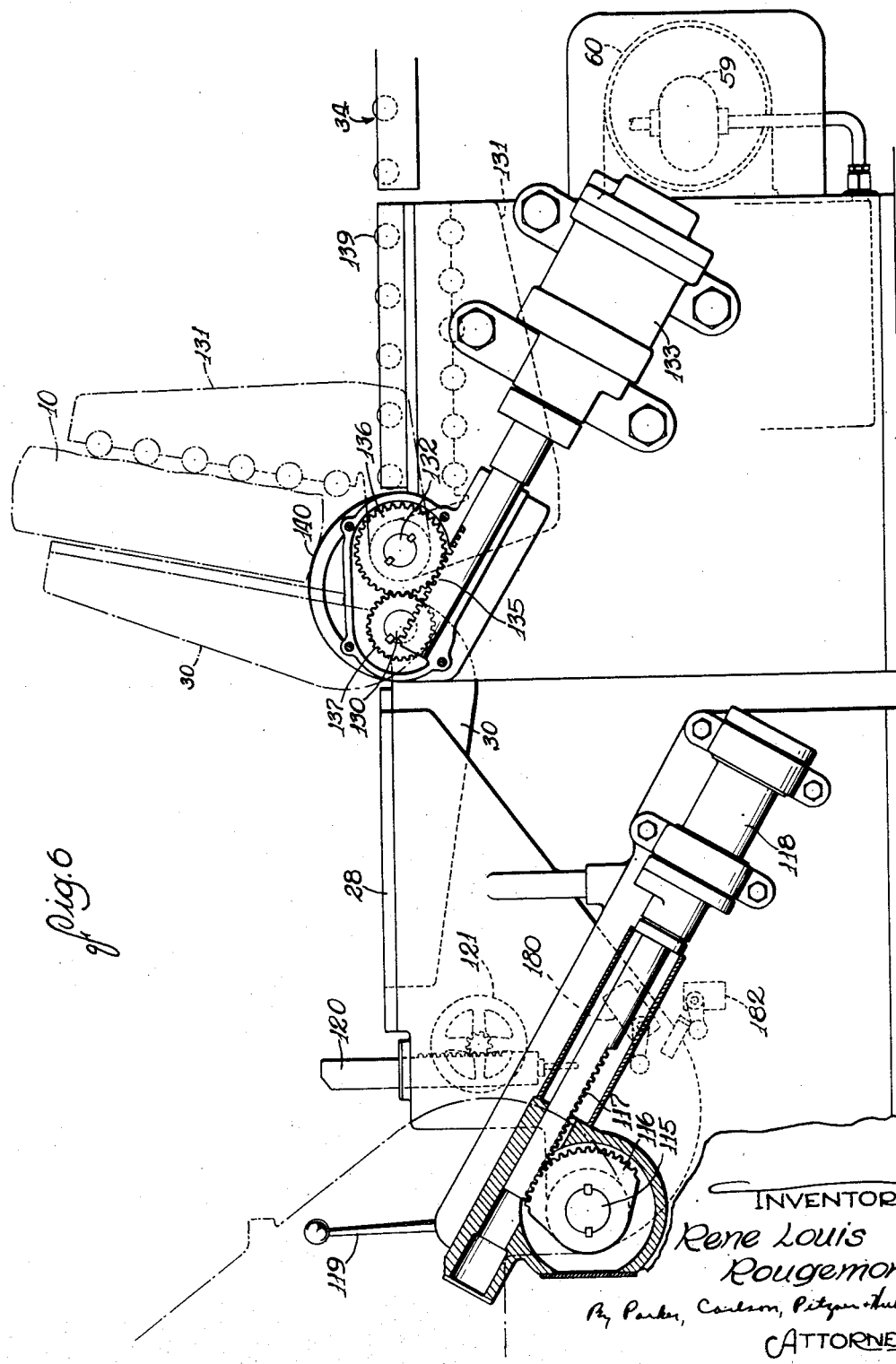

2,142,735

UNITED STATES PATENT OFFICE 2,142,735

METHOD AND MACHINE FOR METAL-WORKING

Rene Louis Rougemont, Rockford, Ill., assignor to The Ingersoll Milling Machine Company, Rockford, Ill., a corporation of Illinois Application December 4, 1936, Serial No. 114,118

23 Claims. (Cl. 90—21)

This invention relates to a method of and a machine for scalping or removing material from the side surfaces of slabs and like work pieces.

One object is to provide a novel method of machining opposite side surfaces of a casting or the like into substantial parallelism while removing a minimum amount of metal.

Another object of the invention is to provide a novel method of and machine for preparing cast bodies of metal such as slabs of aluminum or the like for the performance of rolling or drawing operations.

A further object is to provide a novel machine for handling the work pieces to facilitate machining in accordance with the improved method.

The invention also resides in the novel character of certain of the mechanisms used in carrying out the foregoing objects.

Other objects and advantages of the invention will become apparent from the following detailed description taken in conjunction with the accompanying drawings, in which Figure 1 is a plan view of one preferred form of machine for surfacing the surfaces of metal slabs in accordance with the teachings of the present invention.

Figs. 2, 3 and 4 are sectional views taken respectively along the lines 2—2, 3—3 and 4—4 of Fig. 1.

Fig. 6 is a view in section taken along the line 6—6 of Fig. 1.

Figs. 7 and 8 are fragmentary views, partly in section, showing the work piece in operative position.

Fig. 9 is a similar view showing a smaller work piece.

Figure 5:
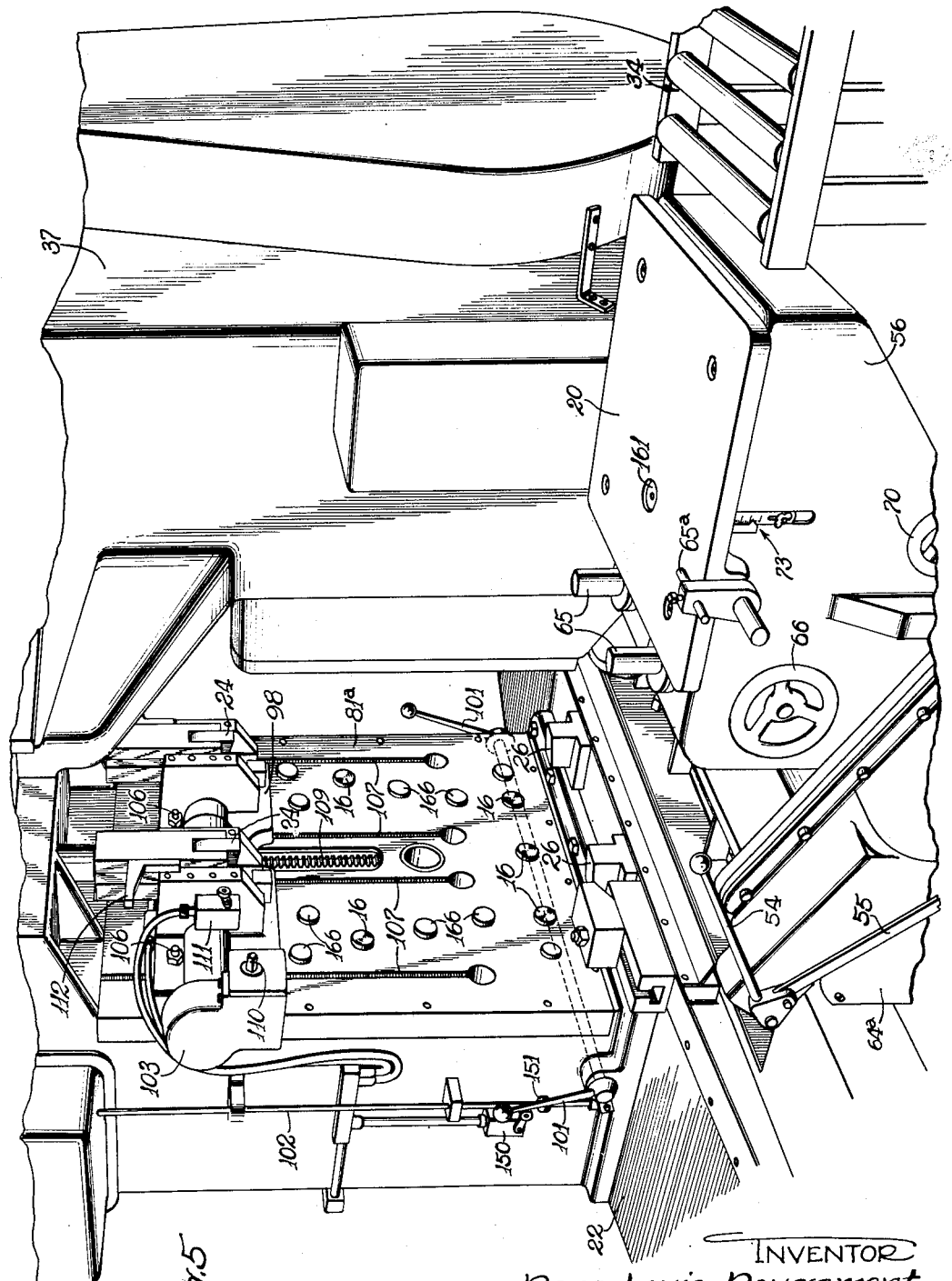
Fig. 5 is a fragmentary perspective view of the parts at the work-loading station.

While the invention is applicable to various industries and a variety of different kinds of work pieces, it will herein be described for convenience of illustration in connection with the preparation of cast slabs or ingots 10 of aluminum or other ductile metal for rolling, drawing or like operations. I do not, however, intend to limit the invention by such disclosure but aim to cover all modifications and alternative constructions and methods falling within the spirit and scope of the invention or expressed in the appended claims.

To prepare ingots of aluminum or the like for rolling into sheets, it is desirable initially to remove the oxidized surface layers of metal from opposite sides of the ingot before the latter is presented to the sheeting rolls, thereby avoiding possible imperfection in the rolled sheet. Also at various stages during the rolling process it is customary to remove the surface layers.

The present invention contemplates scalping or machining opposite sides of a slab or ingot by first pressing the slab between opposed abutments so as to locate one surface substantially in a predetermined plane, then removing a layer of metal from the opposite surface along a parallel plane, and finally removing a layer of metal from the unfinished surface along a plane parallel to and spaced a predetermined distance from the machined surface. In order to form substantially parallel machined surfaces, location of the slab relative to the initial cutting plane is preferably effected by applying pressure to opposite side surfaces of the slab through the medium of a single abutment effectively engaging one side surface intermediate the edges thereof and a plurality of abutments disposed in a common plane and engaging the opposite surface of the slab at points spaced apart in two transverse directions on opposite sides of the first abutment. Then after removal of a layer of metal from the surface engaged by the single abutment, the position of the slab is reversed and the machined surface thereof is pressed against the plurality of abutments after which a layer of metal is removed from the unfinished surface along a plane parallel to and spaced a predetermined distance from the machined surface.

The machine selected for purposes of illustration is especially constructed to facilitate rapid handling of the slabs which are usually too heavy to be lifted readily by a workman and which usually have convexly shaped edges 10$^a$ on account of which the slab will not stand on edge without lateral support. To this end, the slab to be machined is slid in horizontal position onto a platform 20 at a loading station adapted to tilt upwardly whereby to stand the slab on edge and thereby present it to a reciprocable carriage 22. This carriage supports the plurality of abutments indicated at 16 which cooperate with the other abutment formed by the platform 20 to position the slab relative to the plane indicated at 12 of a surfacing tool such as a rotary milling cutter 14. After being located in working position as shown in Fig. 7, the edges of the slab are clamped between jaws 24 and 26 on the carriage and the slab is moved thereby past the cutter 14 which removes a layer of metal along the plane 12.

The carriage comes to a stop at an unloading station at the other end of the machine and after release of the clamps, the slab is transferred onto a vertical unloading platform 28 by which the slab may be lowered into horizontal position. A suitable turnover mechanism at the unloading station operates to invert the slab and transfer it in horizontal position onto a track 34 along which it may be conveyed back to the loading station. The loading operations are then repeated to position the unfinished side of the slab (see Fig. 8) for scalping by the cutter, the machining operations being completed when the slab reaches the loading platform 28 after being passed twice through the machine.

The milling cutter 14 is carried on the end of a horizontal spindle 35 suitably journaled in a column 37 disposed at one side of the machine bed 38 between the loading and unloading stations. Suitable mechanism (not shown) is housed within the column for transmitting power to the cutter from an electric motor 36.

The work carriage 22 is supported in ways 40 to slide longitudinally of the bed 38 and is reciprocated by rotation of a screw 41 cooperating with a rack 42 extending lengthwise of and fixed to the underside of the carriage. Rotation of the screw at different speeds to advance the carriage in either direction at feed and rapid traverse rates may be effected through the medium of well known mechanism driven by a feed motor 39ᵃ (Fig. 1) and a reversible rapid traverse motor 39.

Operation of the cutter driving motor, the carriage feed and rapid traverse motors, and other power driven mechanisms later to be described is controlled manually by the operation of push button switches on a control panel 45 (Fig. 1) accessible to the operator standing at the loading station. Control of the motors to change from rapid approach to feed of the carriage and to stop the carriage at the unloading station is by switches (not shown) operated in a well known manner in response to movement of the carriage. Rapid return of the carriage to the loading station is initiated by operation of a switch on the panel 45, this motion being arrested automatically as the carriage reaches the loading station.

The fixture at the loading station (see Figs. 1, 3, 4, 5 and 7) includes the platform 20 which is supported for universal movement and also for bodily adjusting movement by a member in the form of a casting 56 keyed to a shaft 57 having opposite ends pivoted in bearings 51 in a base structure 52 constituting a lateral extension of the machine bed 38. Tilting of the platform 20 from the horizontal or loading position shown in Figs. 3 and 4 to the vertical position shown in Fig. 7, is effected in the present instance by hydraulic motors on opposite sides of the supporting member 56 each comprising a cylinder 58 supplied with pressure fluid from a pump 59 driven by a motor 60 (see Figs. 1 and 6). The rods of pistons 62 in these cylinders carry racks 63 meshing with segments 64 keyed to the shaft 57, the gears being disposed in housings 64ᵃ. Admission of pressure fluid into the cylinders is controlled by a valve 53 (Fig. 3) actuated by a hand lever 54 (Fig. 5) connected to the valve through the medium of a link 55.

To locate the slab properly on the platform 20 for proper engagement of the cutter 14 with the entire surface thereof, the slab is slid to a position in which one edge contacts a pair of retractible pins 65 forming a supporting ledge on the platform, another edge of the slab being placed in abutment with an adjustable stop 65ᵃ upstanding from the platform. The pins 65 are slidably supported in the casting 56 and are formed near their lower ends with rack teeth meshing with gears 67 on a shaft which may be turned by a hand wheel 66 to advance and retract the pins relative to the platform.

To adjust the position of the platform 20 bodily relative to the supporting member 56 and thereby vary the thickness of the surface layer of metal to be removed by the cutter 14, the platform is supported from the casting 56 through the medium of a bracket 68 (Figs. 4 and 7) having a central portion 69 slidably mounted for axial movement in a bore 69ᵃ in the casting 56. Threading into and supporting the bracket portion 69 is a screw 72 rotatably supported in the casting 56 and adapted to be turned by a hand wheel 70 connected to the screw through the medium of bevel gears 71. The position of the platform and therefore the thickness to which the slab will be milled by the cutter 14 is indicated on a gauge 73 (Figs. 3 and 5).

In order that the platform 20 may serve as the single abutment above referred to and adapt itself to the contour of one side of the slab when the other side is in engagement with the abutments 16, the platform is, when used with relatively large slabs as shown in Fig. 7, preferably mounted for universal movement about a central point of support formed by a ball 74 (Fig. 4) having a shank threaded into the bracket 68, the ball being received in a socket 75 on the underside of the platform. Such universal movement of the platform is permitted by compression springs 76 acting between the corners of the platform and the casting 56. The universal connection is maintained by bolts 77 extending loosely through the platform 20 and the bracket member 68. Pins 78 rigid with the bracket member 68 and projecting through holes 79 in the casting 56 serve to hold the platform against rotation.

Movement of the platform support from the horizontal or loading position shown in Fig. 3 to the vertical position is limited by engagement of a lug 80 (Fig. 4) with an adjustable stop pin 81. The platform pivot 57 is so located that in this upward movement of the platform, the slab 10 thereon will be carried above the lower clamping jaws 26 and the weight thereof will be transferred automatically from the pins 65 to these jaws as the platform reaches its limit position.

The pins 16 which constitute the abutments which cooperate with the platform 20 to locate the work piece relative to the cutting plane 12 are slidably supported intermediate their ends for horizontal axial movement by a vertical plate 81ᵃ rigid with the work carriage 22. The rear ends of the pins abut against a pressure plate 82 on the end of a tubular rod 83 slidably supported in a bore 85 and also in a bushing in the plate 81ᵃ.

Any suitable means may be employed for advancing the pressure plate 82 to project the pins 16 toward the loading platform 20. In the present instance, this means includes a screw 84 rotatably mounted on the carriage and threading into a nut 86 in the rear end of the rod 83. Loose on the screw shaft is a worm wheel 90 meshing with a worm 89 driven by a reversible electric motor 88. The worm wheel is journaled on the screw shaft between two friction plates 91 which are urged together by a compression spring 92 whereby to provide a slip friction connection between the worm wheel and the screw shaft.

Operation of the motor 88 to advance the pressure plate 82 is controlled from a switch on the panel 45. After the plate engages the pins 16 and the work piece has been forced against the vertical face of the platform with the proper pressure determined by the setting of the spring 92, the friction clutch will slip. Since the screw connection is self-locking, the motor may then be stopped without relieving the pressure applied to the slab. When it is desired to relieve the pressure, reverse rotation of the motor 88 is initiated from the control panel. If desired, such rotation may be initiated automatically in response to return movement of the carriage 22 to loading position. The ensuing retraction of the plate is limited when a switch 93 (Fig. 2) is opened by a dog 94 movable with the plate.

In order to locate the projecting ends of the pins 16 in a common plane parallel to the cutting plane 12, the pins are preferably made of the same length and the face of the pressure plate 82 is disposed vertically. In the present instance, five pins 16 are provided, and these are arranged in the guide plate 81ª so as to engage one side of the slab at points spaced apart both vertically and horizontally and disposed on opposite sides of the central pivot point of the platform 20. By locating the abutment faces of the pins in a common plane and by mounting the platform 20 for universal movement so as to constitute a single abutment acting on the slab at a point substantially centrally thereof, the side of the slab opposite the platform will, when the pressure is applied, be positioned parallel to the cutting plane 12. Thus, if the slab is thicker at its lower end as illustrated on an exaggerated scale in Fig. 7, the platform will tilt as shown so that a thicker layer of metal will be removed from the lower portion of the slab. Preferably, the position of the platform 20 relative to its support will be adjusted so that the cutting plane 12 will intersect the positioned slab at all points thereby insuring the formation of a continuous clean cut surface.

In order to accommodate slabs of widely varying dimensions, the guide plate 81ª is provided with a plurality of openings 165 into any selected ones of which the pins 16 may be located. In the case of the comparatively large slab shown in Figs. 2, 3, 7 and 8, the pins may be distributed in the manner shown in Fig. 5. However, with a smaller slab, such as is shown at 10' in Fig. 9, the upper pins are lowered to positions opposite the upper edge of the slab. When not in use, the holes 165 are plugged with blocks 166 of wood or the like.

In order to effect proper positioning of slabs of substantially smaller dimensions than the ones shown in Fig. 7, provision is made for lowering of the effective point of application of pressure by the loading platform 20. For this purpose, the stop bolts 77 which permit universal tilting of the platform are tightened down to secure the platform rigidly to the supporting bracket 68, and an auxiliary pressure shoe 160 is mounted in an opening 161 in the face of the platform 20 with the end of the shoe projecting from the platform face as shown in Fig. 9. Thus the point of pressure application by the shoe 160 is disposed intermediate the abutment pins 16 when the latter are positioned for proper engagement with a slab of narrow width. By virtue of this arrangement, the slab is permitted to aline itself properly in the manner above described under the influence of the pressure applied thereto by the positioning pins 16.

To clamp the positioned slab securely on the carriage 22, the upper jaws 24 are mounted for vertical sliding movement along guideways in a horizontal rail 98 clamped against the front face of the plate 81ª. For this purpose, the jaws are carried by rods of pistons 100 disposed in cylinders 95 to which pressure fluid may be supplied from a pump 96 driven by a motor 97. Control of fluid admission above and below the pistons may be governed by operation of a hand lever 101 arranged to operate a suitable valve mechansm (not shown) through the medium of a link 102. Upward movement of the jaws 24 is limited by engagement between shoulders 105 thereon and lugs 104 on the rail 98.

In order to adapt the clamping mechanism to slabs of varying widths and avoiding slowing up the clamping operation to an objectionable degree, the cylinders 95 are made relatively long and provision is made for adjusting the rail 98 vertically. To this end, the rail carries T-bolts 106 extending through vertical slots 107 in the plate 81ª which bolts when loosened permit of vertical movement of the rail. Rotatably mounted on the rail is a pinion 108 meshing with a rack 109 rigid with the plate 81ª. The pinion 108 is connected through the medium of gearing in a casing 103 to a shaft 110 to which a hand crank may be applied for the purpose of rotating the pinion and raising and lowering the rail. After adjustment of the rail, the bolts 106 are retightened to secure the rail rigidly in place.

In the event that pressure fluid is admitted to the cylinders 95 when no work piece is in position on the carriage, the carriage is prevented from going into feed by an arm 112 which actuates a switch 111 to interrupt the circuit to the feed motor.

To unclamp the work piece and retract the clamps 24 upwardly, the control lever 101 is moved reversely. This causes pressure fluid to be admitted into the lower portion of the cylinders 95 thereby to elevate clamps to a position determined by the engagement of the lower side of slot 105 with the projection 104.

As best shown by Figs. 1 and 6, the mechanism for handling the machined slab at the unloading station is basically similar to the loading mechanism previously described. It includes the platform 28 previously referred to which is pivotally supported on a base through the medium of a shaft 115. Each end of this shaft carries a gear segment 116 which meshes with the teeth on a rack 117 connected to a piston within a hydraulic cylinder 118. Pressure fluid is supplied to the cylinder by the pump 59 under the control of a suitable valve (not shown) actuated by a hand lever 119. The unloading platform is also provided with pins 120 which project beyond its surface and which may be retracted by turning a hand wheel 121.

Associated with the unloading platform is a power operated mechanism by which the partially machined work piece may be inverted and transferred onto the conveyor track 34 preparatory to return to the loading station. This mechanism includes a pair of arms 30 which project into openings in the platform 28 and are rigid with a shaft 130 journaled in the base at the outer end of the platform. Similarly pivoted on the base through the medium of an adjacent parallel shaft 132 is a pair of arms 131.

To swing the arms upwardly in unison, the shafts 130 and 132 carry meshing gears 136 and 137 the former of which meshes with a rack 138 actuated by a fluid pressure motor including a cylinder 133 and a piston therein and controlled by a hand lever 141 (Fig. 1). When pressure fluid is admitted to the upper end of the cylinder with the parts positioned as shown in Fig. 6, both arms 30 and 131 are swung upwardly. As the arms 30 rise, the slab on the platform 28 is raised and swung upwardly around convexly curved rails 140 until it passes over center and moves against the rollers on the arms 131. This over center movement results from the greater angular travel of the arms 30 due to the smaller size of the gear 137. With the arms positioned as shown in dotted outline in Fig. 6, the control lever 141 is reversed admitting pressure fluid to the lower end of the cylinders 133. This returns both sets of arms to horizontal position, the slab having been inverted and positioned on the rollers 139 for ready transfer onto the track 34.

Various interlocks are provided for preventing accidental operation of the power mechanisms at the wrong time. One of these operates to prevent lowering of the platform 20 until the pins 65 have been retracted out of interfering relation with respect to the positioned work piece. This involves a switch 142 (Fig. 4) which operates a solenoid (not shown) to prevent the admission of pressure fluid to the cylinder 58 for lowering the platform 20 until an extension 143 of one pin 65 has engaged and actuated an arm 144.

The unloading platform 28 is provided with a similar interlock, utilizing a disabling device 180 (see Fig. 6), which functions to allow the platform to be tilted into vertical position only when the pins 120 are retracted.

Another interlock takes the form of a switch 145 (Fig. 4) which is actuated by a projection 146 on the pivoted casting 56 as the platform 20 is returned to horizontal position. This switch controls the motor circuits to prevent initial advance of the carriage 22 away from the loading station until the platform 20 has been retracted.

The unloading platform is also provided with a comparable switch 182 (Fig. 6) which functions to allow the reciprocable carriage to be moved away from the unloading station only when the platform 28 is in the horizontal position.

An additional interlock utilizes a switch 150 (Fig. 5) on the reciprocable carriage which is actuated by a projection 151 on the clamping cylinder control link 102.

Closure of the switch results when the lever 101 is operated to clamp the work. Failure to operate or correctly operate the lever 101 permits the switch to remain open thereby disabling the carriage 22.

Operation

The machine above described is arranged to be controlled by two workmen standing adjacent the loading and unloading stations. Assuming that the parts are positioned as shown in full outline in Figs. 5 and 6, a slab to be machined is lowered by a hoist or other device onto the platform 20 and positioned by the operator with one side edge disposed against the pins 65 and with the adjacent edge engaging the stop 65ª. The control handle 54 is then shifted to raise the platform 20 into vertical position whereby to present the slab to the work carriage and transfer the weight of the slab from the pin 65 onto the lower supporting clamps 26. While the platform 20 is still in vertical position, the switch controlling the positioning motor 88 is operated to cause advance of the pressure plate 82 until the pins 16 have engaged one unfinished surface of the slab and pressed the opposite surface firmly against the platform 20 which, by virtue of its universal mounting, adapts itself automatically to the contour and position of the slab surface. If the platform 20 has been set properly, the slab will now be positioned as shown in Fig. 7 with the plane 12 of the cutter 14 intersecting the slab at all points adjacent the surface thereof which abuts against the platform 20.

The loading operator next shifts the lever 101 to energize the clamping motors and cause the upper clamping jaws 24 to be lowered into engagement with the upper surface of the positioned slab. Then by turning the hand wheel 66, the pins 65 are retracted so as to permit lowering of the platform in response to reverse movement of the hand lever 54. When the platform 20 reaches horizontal or loading position, the carriage advancing mechanism is conditioned for operation. Rapid approach movement of the carriage may be initiated by closure of the proper switch on the control panel. As the work piece approaches the cutter, the rate of movement of the carriage is reduced automatically while the work piece is being surfaced by the cutter. As the carriage reaches the unloading station, the advance thereof is interrupted automatically whereupon the unloading operator after retracting the pins 120 (Fig. 6) turns the lever 119 to raise the unloading platform 28. Then after unclamping the work by turning one of the levers 101, the hand wheel 121 is turned to project the pins 120 beneath the partially finished work piece and the lever 119 is reversed to lower the platform 28 with the work piece thereon, the machined surface facing downwardly. After such lowering of the platform 28, the operator at the loading station may initiate rapid return of the carriage to loading position by operating the proper switch on the control panel.

By turning the handle 141, the turnover mechanism may be actuated to raise the arms 30 and 131 to the position shown in dotted outline in Fig. 6 during which movement the slab is raised from the platform 28 and swung upwardly around the rails 140 to the over-center position shown in dotted outline. Upon reverse movement of the lever 141, the slab is lowered by the arms 31 to the level of the conveyor 34 onto which it may be slid with the machined side facing upwardly.

The partially machined slab is moved along the conveyor back to the loading station, and the operation above described is repeated. Because of the inverted position of the slab, the machined surface thereof will, when the platform 20 is again raised, be presented to the positioning pins 16. Then as an incident to advance of these pins, the slab will be pressed against the platform 20 and located relative to the cutting plane 12 as shown in Fig. 8. With the slab thus positioned, metal will, during advance of the carriage past the cutter 14, be removed from the unfinished surface to form a machined surface parallel to the first surface to be machined. After the advance of the work piece thus positioned past the cutter and unloading thereof onto the platform 28, the finished slab is removed from the machine by means of a hoist or the like.

By means of the improved method and machine above described, it will be apparent that the sides of heavy work pieces, such as metal slabs, may be machined into accurate parallelism and at a rapid rate. The machine is automatically adaptable to various thicknesses of slabs and may be adjusted quickly and conveniently for handling slabs of different sizes and degrees of surface roughness.

I claim as my invention:

1. A machine tool having, in combination, a cutter and a work support mounted for relative reciprocatory movement along a cutting plane defined by the cutter, a tiltable loading support adapted to receive a work piece when in substantially horizontal position and operable when tilted out of said horizontal position to present the correspondingly tilted work piece to said work support and locate the same in working position relative to said cutting plane, and means to clamp the tilted work piece in said working position upon said support whereby to permit operation of the cutter on the work piece after retraction of said loading support.

2. A machine for removing material from opposite sides of a slab to form substantially parallel side surfaces having, in combination, a cutter for performing a surface machining operation along a vertical cutting plane, an abutment disposed in a parallel vertical plane, a swingable platform adapted to receive a slab when in a substantially horizontal position and to present the slab opposite said first mentioned abutment when moved to a substantially vertical position, and means for actuating said first mentioned abutment to press the slab against said platform and thereby locate the slab for removal of material by said cutter along a plane parallel to said first mentioned abutment.

3. In a machine for removing metal from the surface of a metal work piece, the combination of a cutter, a reciprocable carriage adapted to support the work piece for movement past the cutter, a loading platform adapted to receive a work piece when in substantially horizontal position and operable when tilted out of said horizontal position to present the work piece to said carriage, power actuated means for tilting said platform, and a ledge associated with said platform for supporting the work piece during tilting thereof.

4. For removing a surface layer of predetermined depth from a metal slab, a milling machine having, in combination, a cutter, a work fixture, a tiltable platform adjustable toward and away from the cutting plane of said cutter and providing when in vertical position a gauging surface spaced from said plane by a distance equal to the thickness of the layer of metal to be removed from the slab surface, means by which said slab may be clamped in said fixture while engaging said surface, means by which the platform may be retracted to permit operation of said cutter upon the slab, and means to effect relative movement between said fixture and said cutter longitudinally of said cutting plane.

5. A machine tool having, in combination, a surfacing cutter, a work support, a loading platform adjacent said work support for receiving a slab to be machined and tiltable to tip the slab vertically on edge and present the same to said support preparatory to clamping thereon, clamps on said work support engageable with opposite edges of said slab to secure the same to said support, and means for effecting relative movement between said support and said cutter along the cutting plane defined thereby.

6. A machine tool having, in combination, a surfacing cutter, a work support, a loading platform adjacent said work support for receiving a slab to be machined and tiltable to tip the slab vertically on edge and present the same to said support preparatory to clamping thereon, clamps on said work support engageable with opposite edges of said slab to secure the same to said support, means for effecting relative movement between said support and said cutter along the cutting plane defined thereby, and means to disable said last mentioned means against effective operation until said platform has been retracted.

7. A machine for performing a surfacing operation upon a work piece comprising, in combination, a cutter adapted to operate upon one surface of the piece, a reciprocable carriage adapted to support the work piece for movement longitudinally of the cutter, a loading support adapted to receive a work piece in substantially horizontal position and to tilt the same to a substantially vertical position to present the work piece to said carriage, clamps on the carriage adapted to secure the work piece thereto during engagement with said cutter, and an unloading mechanism at the other end of the machine adapted to receive a machined work piece from the carriage and to tilt it back to substantially horizontal position.

8. A machine for removing material from opposite side surfaces of a slab having, in combination, a carriage arranged to support a slab edgewise in vertical position during movement from a loading to an unloading station past a cutter for operating upon one surface of the slab, a horizontal conveyor extending between said loading and unloading stations, a tiltable support at the loading station adapted to receive a slab from said conveyor in a substantially horizontal position and to present the same to said carriage in substantially vertical position, and a tiltable support at the unloading station adapted to receive a machined slab and to tilt the same to substantially horizontal position for transfer onto said conveyor.

9. A machine for removing material from opposite side surfaces of a slab having, in combination, a carriage arranged to support a slab edgewise in vertical position during movement from a loading to an unloading station past a cutter for operating upon one surface of the slab, a horizontal conveyor extending between said loading and unloading stations, tiltable platforms at each of said stations, the loading platform being adapted to receive a slab from said conveyor in a substantially horizontal position and to present the same to said carriage in substantially vertical position, the unloading platform being adapted to receive a machined slab and to tilt the same to substantially horizontal position for transfer onto said conveyor, and means for inverting a slab during the transfer thereof from said unloading platform to said conveyor.

10. A machine for removing material from opposite side surfaces of a slab having, in combination, an elongated bed, a loading station at one end of the bed, an unloading station at the other end of the bed, a cutter intermediate said stations, a carriage reciprocable on said bed from one station to the other and having means to clamp a slab to be carried past the cutter, a work conveyor extending between said unloading and loading stations, and power operated means by which a slab may be inverted while being transferred from the unloading to the loading station along said conveyor.

11. A machine tool having, in combination, a cutter arranged to remove metal from a work piece along a predetermined cutting plane, a plurality of abutments laterally spaced from each other in two transverse directions and movable towards and away from said cutting plane, said abutments being disposed in a plane parallel to said first mentioned plane, a gauging abutment disposed opposite said abutments and engageable with a work piece on a portion thereof opposite an intermediate portion of the area encompassing the first named abutments and spaced from said plane thereof, means for pressing a work piece to be machined between said abutments, a work support to which the positioned work piece may be clamped, said gauging abutment being adjustable transversely of said planes to determine the depth of cut taken by said cutter.

12. A machine tool having, in combination, a plurality of abutments disposed in a common plane and spaced laterally of each other in at least two transverse directions, an opposing abutment mounted for universal movement, means for pressing a work piece to be machined between said abutments, a work support to which the positioned work piece may be clamped, and a cutter operable after retraction of said second abutment arranged to remove a layer of metal from the side of the positioned work piece adjacent said second abutment along a plane parallel to said first mentioned plane.

13. A machine tool having, in combination, a plurality of abutments disposed in a common plane, an opposed gauging abutment disposed opposite an intermediate portion of the area encompassing the first named abutments and spaced from said common plane thereof, means for pressing a slab or the like to be machined between said abutments, a support to which the positioned work piece may be clamped to permit retraction of said gauging abutment, and cutting means to remove a layer of material from the surface of said slab that was in contact with said gauging abutment along a plane parallel to said first mentioned plane.

14. A metal working machine having, in combination, a cutter for performing a surface machining operation, a fixture for supporting a work piece, a gauge selectively adjustable transversely of said cutting plane of said cutter to determine the depth of the cut taken by the cutter, an opposed abutment movable transversely of said cutting plane engageable with the work piece at a plurality of laterally spaced points to locate the work piece against said gauge and position the opposite side surface of the work piece in a plane substantially parallel to said cutting plane, and means to effect relative movement between said cutter and said fixture longitudinally of said cutting plane.

15. A machine for removing material from opposite sides of a work piece to form substantially parallel surfaces thereon having, in combination, a cutter for performing a surface machining operation, abutment means for locating one side surface of the work piece in a plane parallel to the cutting plane of said cutter, a retractible gauging abutment engageable with the opposite side of said work piece to space the first mentioned surface a predetermined distance from said cutting plane, a work support, means for clamping a work piece to said support after positioning thereof by said abutments, and means to effect relative movement between said cutter and said support longitudinally of said cutting plane with the work piece secured to said support by said clamping means.

16. In a machine for removing metal from one surface of a metal slab, the combination of a cutter, a work support provided with clamps for securing a slab thereto, a plurality of laterally spaced abutments defining a plane predeterminately related to the cutting plane of the cutter, means for urging said abutments against one surface of the slab, an opposing abutment acting upon the opposite surface of the slab at a point intermediate said abutments, and means yieldably supporting said opposing abutment for retaining the same in engagement with the slab as the latter tilts into conformity with the position of said first mentioned abutments.

17. A machine for scalping slabs of various sizes having, in combination, a cutter, opposed abutments engageable with opposite sides of a slab to be machined to position a slab relative to said cutter, and means for pressing said abutments toward each other, one of the abutments being formed by the ends of a plurality of parallel pins, and a plate movably supporting said pins in a plurality of different laterally spaced positions whereby to permit ready shifting of the pins for engagement with slabs of different sizes.

18. In a machine for removing material from the surface of a slab, the combination of a cutter, a reciprocable carriage adapted to support a slab edgewise in substantially vertical position for movement longitudinally of the cutter, and an unloading mechanism adapted to receive a machined slab from the carriage and to tilt it away from the carriage into a substantially horizontal position.

19. In a machine tool, the combination of a work support, a movable clamp on the support adapted to secure thereto work pieces of widely varying dimensions, a hydraulic cylinder having a piston for actuating said clamp, adjustable means independent of said piston for bodily shifting said clamp toward and away from said work piece to change the initial or unclamped position thereof to accommodate work pieces of different sizes, and means responsive to the movement of said piston through a retractive stroke of fixed length for stopping said clamp in its adjusted initial position.

20. In a machine of the character described, a turnover mechanism having, in combination, two substantially horizontal arms mounted to swing about adjacent pivots and one adapted to support a slab to be inverted, a common actuator for swinging the arms in opposite directions to raise one of the arms and move it beyond over-center vertical position and raise the other arm to a parallel position whereby to receive a slab tilted over-center by the first mentioned arm.

21. The method of surfacing the opposite sides of a metal slab which comprises, initially positioning the slab by applying pressure to one side face of it at a plurality of points lying in a common plane and simultaneously applying pressure to the opposite face at a point opposite the area encompassing the points of opposed pressure application, scalping a layer of metal from said opposite face of said slab along a plane paralleling said first named plane, reversing the slab and repositioning the same by applying pressure to the scalped face thereof at a plurality of spaced points and simultaneously applying pressure to the opposite or unscalped face at a point opposite the area encompassing the points of opposed pressure application, and scalping a layer of metal from the unscalped face along a plane paralleling that of the previously scalped face.

22. The method of surfacing the opposite sides of a metal slab which comprises positioning and repositioning the same for the successive scalping of the opposite sides thereof by applying pressure to first one side of the slab and then the other at a plurality of points lying in a common plane while in each case simultaneously applying pressure to an opposite face within an area opposite to the area encompassing the plural points of pressure application, and in each position scalping a layer of metal from the face opposite said plural points of pressure application and along a plane paralleling said common plane of said points.

23. A machine for surfacing slabs having, in combination, a work support having work clamping means thereon, a plurality of abutments presenting a bearing surface disposed in a vertical plane and arranged for engagement with one side of a slab disposed on edge in vertical position on said work support, means for supporting said slab and presenting the same in vertical position to said support in a position opposite said abutments and with said one side thereof facing the same, said last mentioned means providing an abutment engaging the slab on the side thereof opposite said one side and adjacent said abutments, means for pressing said slab between said abutments while maintaining the first mentioned abutments in a common plane, means for thereafter actuating said clamping means, and a cutter for removing material from the slab along a plane parallel to said first mentioned plane on the side of the slab opposite said first mentioned abutments.

RENE LOUIS ROUGEMONT.